George W. McMillan
INVENTOR.

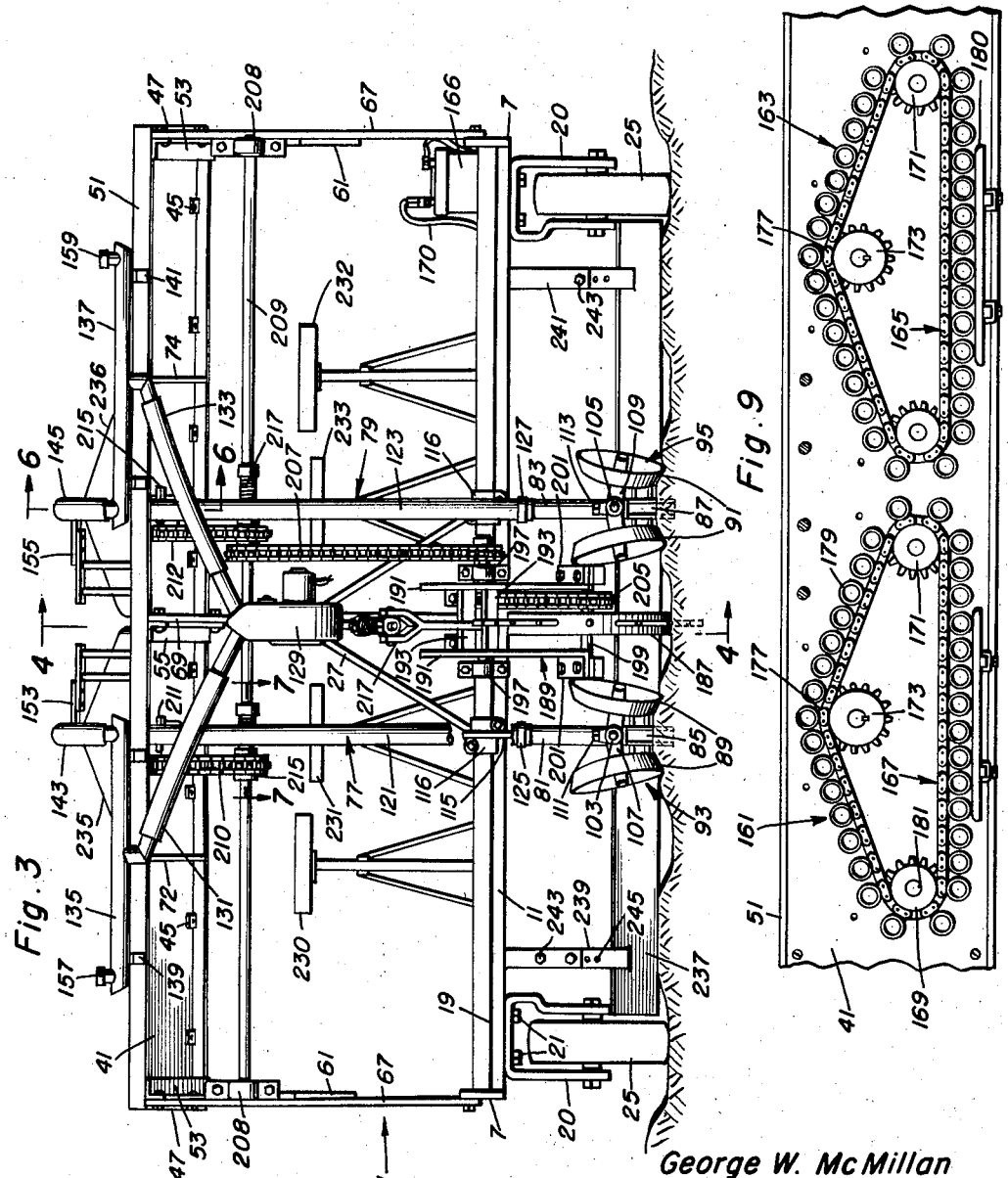

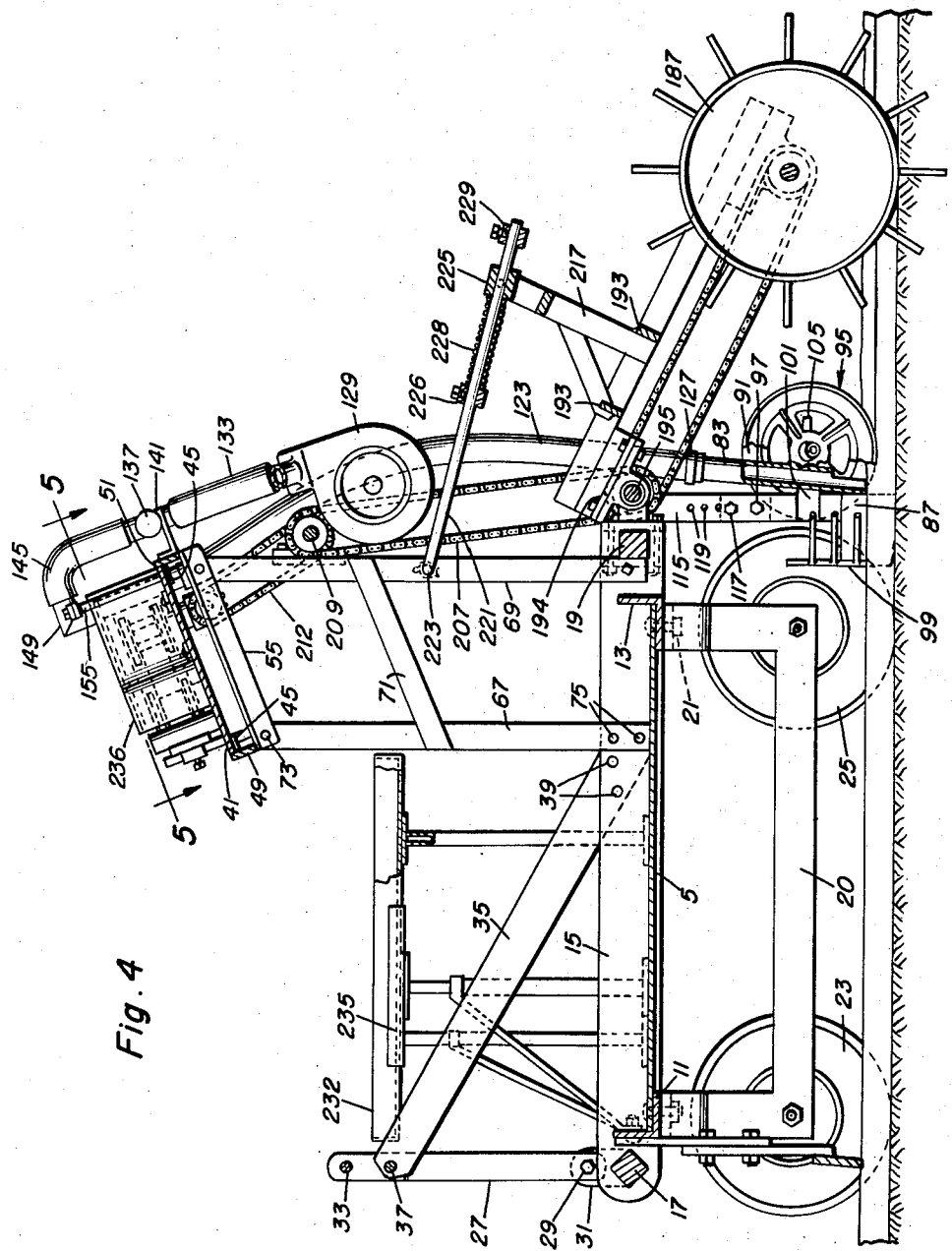

Aug. 18, 1959  G. W. McMILLAN  2,899,918
ONION TRANSPLANTING MACHINES
Filed Sept. 15, 1955  5 Sheets-Sheet 5
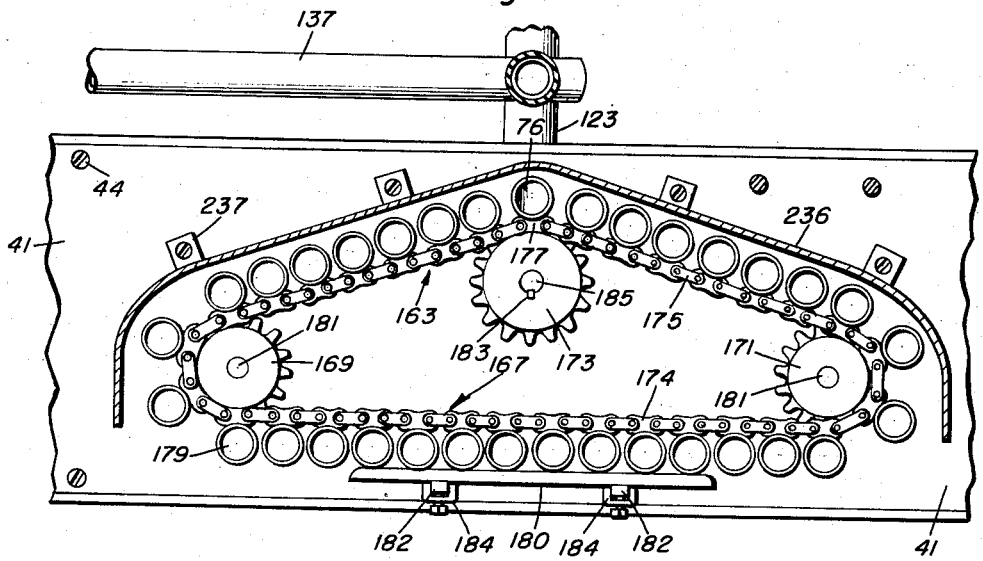
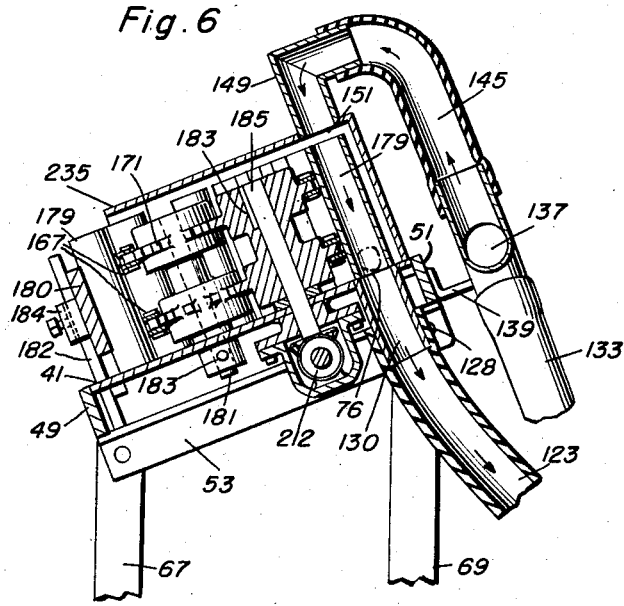
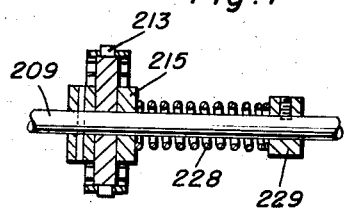
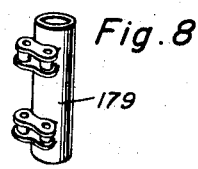
George W. McMillan
INVENTOR.

United States Patent Office 2,899,918
Patented Aug. 18, 1959

2,899,918

ONION TRANSPLANTING MACHINES

George W. McMillan, Carrizo Springs, Tex., assignor of one-half to E. C. McRorey, Carrizo Springs, Tex.

Application September 15, 1955, Serial No. 534,538

2 Claims. (Cl. 111—3)

My invention relates to improvements in onion transplanting machines of the tractor-trailer type.

The primary object of my invention is to provide a machine with means for attaching the same to the conventional rear power lift of a tractor for lowering and raising thereby into and from transplanting position and which embodies means for transplanting onion plants in a plurality of side-by-side furrows with the plants spaced apart equidistantly in rows in each furrow.

Another object is to provide in such a machine pneumatic means for distributing the plants in upright position into the furrows between furrow openers and coverers so that the plants are properly positioned in the furrows quickly at a uniform depth before the furrows are covered.

Another object is to provide in the machine conveyor means adapted to be loaded by attendants seated on the machine and to feed the loaded plants in upright position to the distributing means for distributing by the distributing means in upright position.

Still another object is to provide drive means for the conveyor means including a ground engaging spur wheel mounted for vertical compensating movement over uneven ground between furrows together with means operatively connecting the spur wheel to the conveyors for synchronized drive of the conveyors.

Other and ancillary objects together with the precise nature of my improvements and the advantages thereof will become readily apparent when the following description and claims are read with reference to the drawings accompanying and forming part of this specification and in which:

Figure 3 is a view in rear elevation of the machine;

Figure 4 is an enlarged view in vertical transverse section taken on the line 4—4 of Figure 3;

Figure 5 is an enlarged fragmentary view in horizontal section taken on the line 5—5 of Figure 4;

Figure 6 is an enlarged fragmentary view in vertical transverse section taken on the line 6—6 of Figure 3;

Figure 7 is an enlarged fragmentary view in horizontal section taken on the line 7—7 of Figure 3;

Figure 8 is an enlarged view in perspective of one of the plant conveyor tubes; and Figure 9 is a fragmentary view in plan of the conveyor means, and associated parts.

Figure 1:
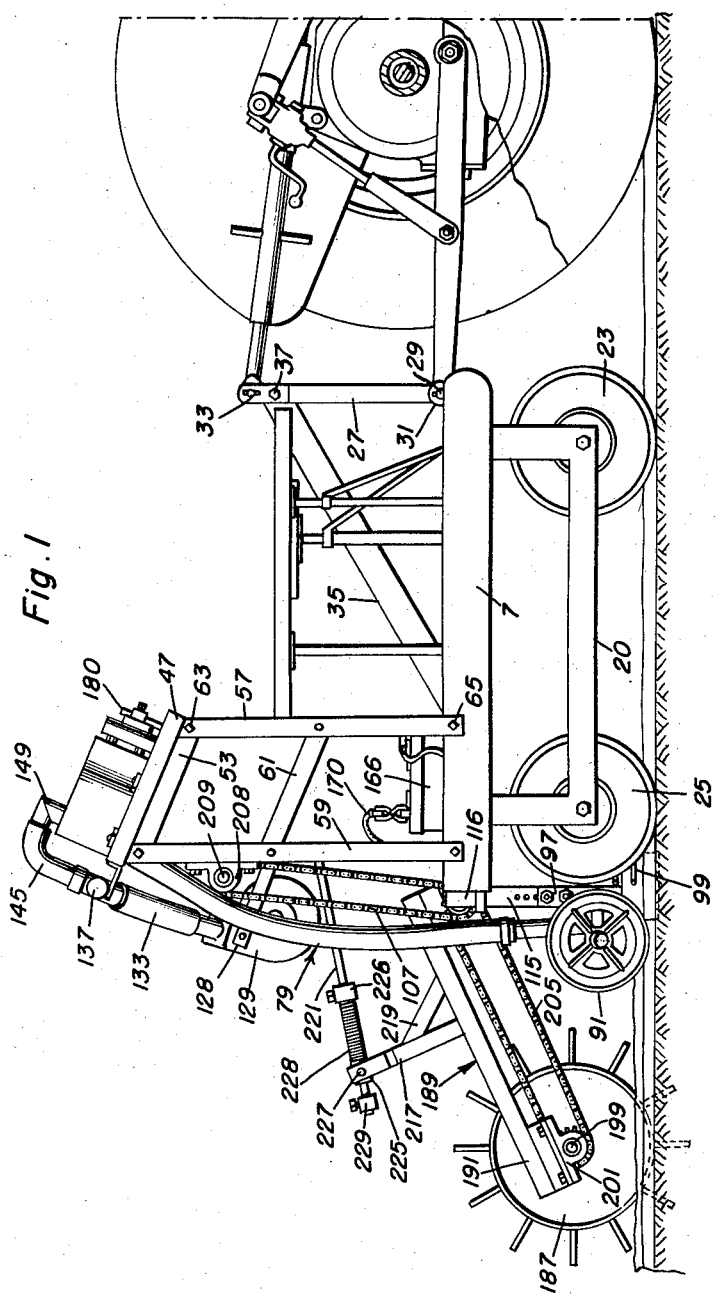
Figure 1 is a fragmentary view in side elevation of my transplanting machine, in a preferred embodiment, attached to a tractor.

Referring by numerals to the drawings, my transplanting machine has been shown therein for illustrative purposes as a two-row transplanter, which in the preferred embodiment thereof comprises a wheeled carriage designated generally by the numeral 1, and which is of elongated rectangular shape and adapted to extend endwise transversely of the tractor 3.

The carriage 1 comprises a deck panel 5 fitted between flat transverse end bars 7 and seated in and suitably secured to front and rear longitudinal angle bars 11, 13. A substantially central flat transverse reinforcing bar 15 extends across the deck panel 5 and longitudinal front and rear polygonal rods 17, 19 are fixed in the end and central transverse bars 7, 15 horizontally and serve a purpose presently seen. The described deck may be a welded together all metal unit, the welding not being shown. A pair of channel wheel mounts 20 of U-shape in cross-section extend transversely of the ends of the deck panel 5 beneath the same with ends bolted, as at 21, to the angle bars 11, 13 and in which are journaled pairs of front and rear ground wheels 23, 25 for supporting the deck panel 5 when the machine is lowered into transplanting position.

The means for attaching the machine to the power lift of the tractor 3 comprises an upstanding yoke 27 of inverted V-shape having lower ends attached by bolts 29 to upstanding lugs 31 on the front rod 17 and a transverse bolt 33 extending through its upper end. A brace bar 35 extends downwardly and rearwardly from the upper portion of the yoke 27 and has its front end bolted, as at 37, to said yoke and its rear end bolted, as at 39, to the beforementioned central reinforcing bar 15. The rear ends of the side lift arms 40 of the conventional power lift 43 of the tractor 3 are pivoted on the bolts 29 and the rear end of the compression arm 34 of the power lift is pivoted on the bolt 33 so that lowering and raising of said arms will raise and lower the carriage 1 while maintaining said carriage level. As will be understood, the bolts 29, 33 are detachable for detaching the carriage 1.

Figure 2:
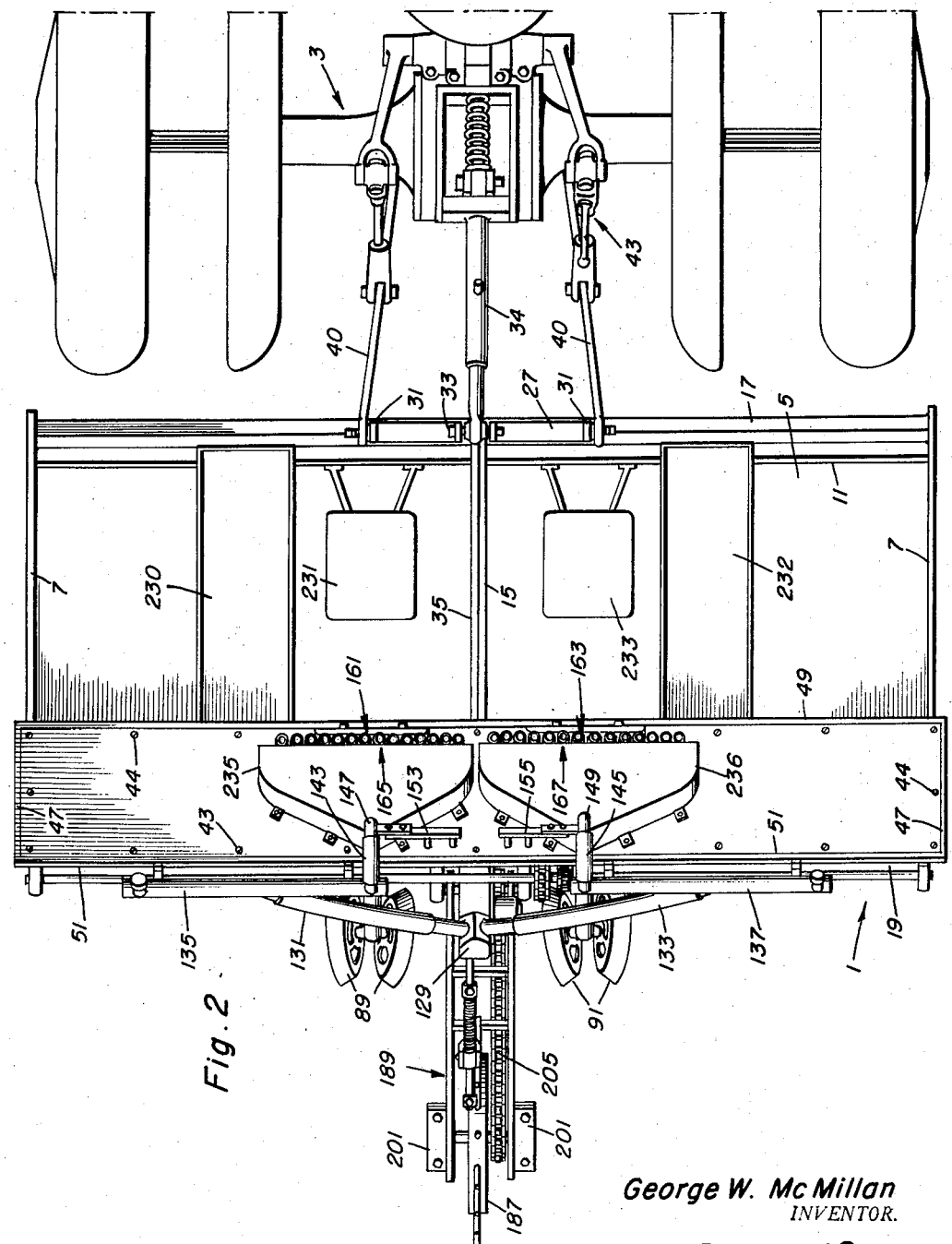
Figure 2 is a view in plan of the same.

Surmounting the deck 5 in elevated position is an elongated, rectangular conveyor supporting platform 41 narrower than the deck 5 at the rear thereof and extending endwise along the rear portion of said deck. Bolts 44 (Fig. 2) secure the platform 41 to lugs, as at 45, on reinforcing end bars 47 and front and rear side bars 49, 51 which are suitably secured on end angle bars 53 and a central angle bar 55 extending transversely of said platform 41.

Pairs of front and rear supporting legs 57, 59 cross-connected in the pairs by brace bars, as at 61 in Figure 1, are secured at upper and lower ends thereof by bolts 63, 65 to the angle bars 53, 55 and the bars 7. Also, a pair of front and rear supporting legs 67, 69 cross-connected by a brace bar 71 are provided in the transverse center of the deck 5 and platform 41 with upper and lower ends bolted, as at 73, 75 to the central angle bar 55 and to the before mentioned transverse bar 15. Other bars 72, 74 extending between the bars 49, 51 reinforce the platform 41. The platform 41 inclines transversely downwardly and forwardly, the purpose of which will presently be clear.

The pneumatic distributing means comprises a pair of opposite pneumatic upright distributing pipe lines 77, 79 one for each row to be transplanted, and which are suspended at upper ends thereof from the rear portion of the platform 41 and depend behind the deck 5 with their upper ends open, as at 76, flush with said platform and suitably fixed therein, as shown in Figure 6 with respect to pipe line 79, and their lower ends terminating adjacent the ground. The pipe lines 77, 79 are spaced apart longitudinally of the platform 41 upon opposite sides of and equidistantly from the transverse center of the carriage 1.

The pipe lines 77, 79 comprise lower end upright pipe sections 81, 83 interposed between front furrow opening shovels 85, 87 and trailing pairs of side-by-side rearwardly converging furrow covering wheels 89, 91 of furrow opening and closing units 93, 95 disposed at the rear of the deck 5 and spaced apart upon opposite sides of the transverse center of the carriage 1 in accordance with the distance between rows to be transplanted.

Each furrow opening and closing unit 93, 95 comprises an upright shank 97 to which the shovel 85, 87 as the case may be is fixed with a front weed fender grid 99. The shank 97 has a rearwardly extending boss 101 integral with the pipe section 81, 83 which have formed thereon rearwardly extending studs 103, 105 on which the covering wheels 89, 91 are mounted by cross-members 107, 109 and setscrews 111, 113. Each shank 97 is vertically adjustably mounted on a bar 115 depending from and clamped, as at 116, to the bar 19, and by bolts 117, insertable in bolt holes 119 in the bars. As will be seen, the pipe sections 81, 83 form part of the furrow opening and closing units 93, 95 and are vertically adjustable therewith to vary the depth at which the onion plants will be transplanted.

To compensate for vertical adjustment of said units 93, 95, the distributing pipe lines 77, 79 include intermediate flexible pipe sections 121, 123 coupled at their lower ends as at 125, 127 to the upper ends of the pipe sections 81, 83 and having their upper ends sleeved onto and fastened, as at 128 to nipples 130 one of which is shown in Figure 6 and depending from and suitably fixed in the platform 41.

Air pressure supply means forms part of the pneumatic distributing means and comprises the following. A blower fan and motor unit 129 is mounted in the rear of the carriage 1 on a bracket 128 on the center leg 59 and from which a pair of upwardly diverging sectional pipes 131, 133 extend oppositely to a pair of horizontal manifold pipes 135, 137 extending longitudinally of the platform 41 in end-to-end spaced apart relation in the rear thereof and secured by brackets 139, 141 to the rear bar 51 of said platform 41. A battery 166 on the deck 5 is suitably wired as at 170 to the motor of said unit 129.

A pair of upright goose neck sectional pipes 143, 145 rise from confronting ends of the manifold pipes 135, 137 and terminate in downwardly opening L-pipe sections 147, 149 each of which overlies and is axially aligned with an associated nipple 130, as shown for instance in Figure 6, and is spaced upwardly therefrom to form a gap 151 above the platform 41 between the L-pipe section 147, 149, as the case may be, and the associated nipple 130. Brackets 153, 155 on the platform 41 support the L-shaped pipe sections 147, 149. As will be seen, the manifold pipes 135, 137 are provided with terminal taps 157, 159 for attaching other goose neck sectional pipes, not shown, thereto for the purpose of adding distributing means to the machine to convert the same into a four row transplanter, which need merely be mentioned in passing. The nipples depend from the platform 41.

The conveyor means comprises a pair of elongated, conveyors 161, 163 each including a pair of vertically spaced sprocket chains 165, 167 and said conveyors extend longitudinally over the platform 41 in aligned spaced apart relation upon opposite sides of the transverse centerline of the carriage 1.

As best shown in Figures 5, 6 and 9, the pairs 165, 167 of sprocket chains are trained around end twin idler sprocket wheels 169, 171 and an intermediate twin sprocket wheel 173 arranged in triangular formation to provide straight front runs 174 extending longitudinally of the platform 41, and rearwardly bulged obtuse angled run 175. The apices 177 of the runs 175, as best shown in Figure 9, are directly in front of the upper ends 76 of the distributing lines 77, 79. Upright plant conveying tubes 179 perpendicular to the platform 41 and resting thereon are suitably fixed to the pairs 165, 167 of sprocket chains in closely laterally spaced relation and which are carried by said pairs of chains successively into the gaps 151 into axial alignment with the upper ends 76 of the distributing pipe lines 77, 79 to feed onion plants placed in said tubes into said lines 77, 79.

A guard panel 180 is mounted on the platform 41 in front of each straight run 174 and is secured in upright position to the platform 41 by clamps 184 on post 182 rising rigidly from the platform 41.

The idler sprocket wheels 169, 171 revolve on upright spindles 181 suitably fixed in the platform 41 as shown at 183 in Figure 6. The intermediate sprocket wheels 173 are keyed, as at 183, on upright spindles 185 journaled in the platform 41 perpendicular thereto and which together with said sprocket wheels 173 form part of the drive means for the conveyor means and which further comprise the following.

A ground engaging spur wheel 187 is mounted in the rear and transverse center of the carriage 1 on an upwardly and downwardly swingable frame 189 comprising opposite side bars 191 extending rearwardly from the carriage 1 and cross-connected by bars 193, said bars 191 pivotally mounted at front ends thereof by bearings 194 on a frame supporting cross-shaft 195 journaled in bearings 197 on the bar 19.

The spur wheel 187 is fast on a drive shaft 199 journaled in bearings 201 on the front ends of the bars 191. A sprocket and chain drive 205 drivingly connects the drive shaft 199 to the frame supporting shaft 195. A second sprocket and chain drive 207 drivingly connects the frame supporting shaft 195 to a driven shaft 209 extending longitudinally of the carriage 1 between the deck 5 and the platform 41 and journaled at its ends in the rear of said carriage in bearings 208 on the rear legs 67. A pair of sprocket and chain drives 210, 212 drivingly connect said shaft 209 to a pair of encased bevel gear units 211, 213 one of which is best shown in Figure 6 and which operatively connect the sprocket and chain drives 210, 212 to the lower end of the spindles 185.

Spring tensioned conventional slip clutches 215, 217 on the shaft 209, one of which is best shown in Figure 7, provide for friction drive of the sprocket and chain drives 210, 212 by the shaft 209 as a safety provision.

Hold-down means is provided for the frame 189 to yieldingly engage the spur wheel 187 with the ground for compensating vertical movement over uneven ground. This means comprises a yoke arm 217 rising from one of the cross-connecting bars 193 of said frame 189 and braced, as at 219, to the other of the cross-connecting bars 193. A hold-down rod 221 extending rearwardly from the carriage 1 over the frame 189 is swingably pivoted, as at 223, to the rear leg 69 for upward and downward movement with its rear end slidably extended through a bushing 225 having a transverse pivot 227 in the yoke arm 217. A compression spring 228 on said rod 221 between the bushing 225 and a set collar 226 on said rod urges said arm rearwardly and the frame 189 downwardly. A set collar 229 on the rod 221 in the rear of the bushing 225 limits such movement of said arm 217 and the frame 189 so that when the carriage 1 is raised to raise the machine from transplanting position, the spur wheel 187 will be raised from the ground.

Suitable raised seats 231, 233 on the deck 5 in front of the platform 41 and opposite the conveyors 161, 163 are provided and on which attendants may sit to feed onion plants into the plant conveying tubes 179. Elevated trays 230, 232 for onion plants are provided on the deck 5 alongside the seats 231, 233.

Covers 235, 236 are provided for the conveyors 161, 163 which are fastened to the platform 41 by bolted down lugs 237 and which are open at its front as shown in Figure 5 with the conveyor tubes 179 on the straight runs 173 of the pairs 165, 167 of sprocket chains extending out of their fronts. The L-pipe sections 149 extend through the cover 235 as shown in Figure 6.

A ground leveling bar 237 at the front of the carriage 1 is suspended from the front bar 17 longitudinally of the carriage 1 for leveling off ridges in the ground to the correct height for the furrow opening and covering units 93, 95. Sectional bar hangers 239, 241 vertically adjustable by means of bolts 243 and bolt holes 245 suspend the leveling bar 237 from the front bar 17 for vertical adjustment as required.

In operating and using the described transplanting machine, the carriage 1 is lowered by lowering of the side arms 40 of the power lift 43, until the wheels 25 and the spur wheel 187 engage the ground, and while the tractor 3 is moving forwardly. This positions the furrow opening and covering units 93, 95 to dig furrows and cover the same and the spur wheel 187 to dig into the ground between furrows and to rotate. The motor fan unit 129 is energized by any suitable switch, not shown. Rotation of the spur wheel 187 causes rotation of the frame supporting shaft 199 which through the sprocket and chain drive 205 rotates the drive shaft 195 to impart rotation to the shaft 209 through the sprocket and chain drive 207. Rotation of shaft 209 rotates the bevel gear drive units 211, 213 whereby the pairs 165, 167 of sprocket chains are driven counterclockwise as viewed in Figure 2 while the motor fan unit blows air under compression through the pipes 131, 144, manifold pipes 135, 137 and pipes 143, 145 downwardly into the upper ends 76 of the distributing pipe lines 77, 79.

With the machine operating as set forth in the preceding paragraph, attendants occupying the seats 231, 233 take onion plants from the trays 230, 232 and insert the same downwardly into the plant conveyor tubes 179 on the front runs 174 of the pairs of sprocket chains 165, 167 to rest on the platform 41. The thus loaded conveyor tubes 179 are then carried successively into the gaps 151 to bridge the same and the loaded onion plants are blown out of the same and downwardly through the distributing pipe lines 77, 79 into the furrows as soon as the loaded tubes 179 are axially aligned with the L-pipe sections 143, 145 and the upper ends 76 of the distributing pipe lines 77, 79 and are thus moved into an unloading position. The onion plants are thus distributed in the furrows behind the furrow opening shovels 85, 87 and firmly transplanted by covering of the furrows by the covering wheels 89, 91.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a machine for transplanting onion plants, a carriage adapted to be drawn forwardly along a furrow in a field and comprising a deck having sides provided with ground wheels, a transverse platform on said carriage for supporting onion plants in upright position, means mounting said platform in elevated position on said deck for access thereto by an operator on the deck, a plant discharge nipple fixed in and depending from said platform and having a plant distributing tube depending therefrom and adapted to distribute plants in a furrow, an endless traveling chain conveyor above said platform having its longitudinal dimension extending transversely of the carriage in front of said discharge nipple and having fixed thereon a plurality of side by side plant conveying tubes having lower ends sliding on the platform with the tubes perpendicular to said platform for loading through their upper ends with upright plants to move the same in upright position over the platform to said nipple and having a front longitudinal loading run, and means on said platform operatively mounting said conveyor to travel past said nipple and successively axially align said tubes with said nipple for discharge of plants from said loaded tubes into said nipple, said platform and conveyor slanting downwardly and forwardly to similarly slant said tubes for convenient access to the upper ends of the tubes of the loading run by an operator on said deck in front of the platform and conveyor.

2. The combination of claim 1 and a protective cover on said platform for said conveyor exposing said front run for loading by an operator.

References Cited in the file of this patent

UNITED STATES PATENTS

| | | |
|---|---|---|
| 516,745 | Pitt | Mar. 20, 1894 |
| 1,657,944 | Stocker et al. | Jan. 31, 1928 |
| 1,810,671 | Matheson | June 16, 1931 |
| 1,926,476 | Dekker | Sept. 12, 1933 |
| 2,479,534 | Bergh | Aug. 16, 1949 |
| 2,673,536 | Skinner | Mar. 30, 1954 |
| 2,790,255 | Riley et al. | Apr. 30, 1957 |

FOREIGN PATENTS

| | | |
|---|---|---|
| 453,651 | France | June 13, 1913 |
| 646,825 | France | Nov. 16, 1928 |
| 670,047 | Great Britain | Apr. 9, 1952 |
| 705,821 | Great Britain | Mar. 17, 1954 |